United States Patent [19]
Dasgupta et al.

[11] Patent Number: 5,582,935
[45] Date of Patent: Dec. 10, 1996

[54] COMPOSITE ELECTRODE FOR A LITHIUM BATTERY

[76] Inventors: Sankar Dasgupta, c/o The Electrofuel Manufacturing Company Ltd. 21 Hanna Avenue, Toronto, Ontario, Canada, M6K 1W9; James K. Jacobs, 69 Albany Avenue, Toronto, Ontario, Canada

[21] Appl. No.: 535,673

[22] Filed: Sep. 28, 1995

[51] Int. Cl.$^6$ .................................................. H01M 4/58
[52] U.S. Cl. ........................... 429/218; 429/233; 429/245
[58] Field of Search .................................... 429/218, 233, 429/245

[56] References Cited

U.S. PATENT DOCUMENTS

| | | | |
|---|---|---|---|
| 4,710,439 | 12/1987 | Tarascon | 429/218 |
| 4,818,647 | 4/1989 | Plichta et al. | 429/218 |
| 4,911,995 | 3/1990 | Belanger et al. | 429/192 |
| 5,013,620 | 5/1991 | Miyazaki et al. | 429/218 |
| 5,196,278 | 3/1993 | Idota | 429/218 |
| 5,196,279 | 3/1993 | Tarascon | 429/218 |
| 5,213,914 | 5/1993 | Heitbaum et al. | 429/218 |
| 5,217,828 | 6/1993 | Sangyoji et al. | 429/192 |
| 5,264,201 | 11/1993 | Dahn et al. | 429/218 |
| 5,271,870 | 12/1993 | Liepins et al. | 252/518 |
| 5,278,000 | 1/1994 | Huang et al. | 429/218 |
| 5,278,006 | 1/1994 | Dunham | 429/206 |
| 5,286,582 | 2/1994 | Tahara et al. | 429/218 |
| 5,296,319 | 3/1994 | Bito et al. | 429/218 |
| 5,316,877 | 5/1994 | Thackeray et al. | 429/218 |
| 5,348,824 | 9/1994 | Duval | 429/192 |
| 5,350,648 | 9/1994 | Kagawa et al. | 429/218 |
| 5,368,959 | 11/1994 | Koksbang et al. | 429/212 |
| 5,393,619 | 2/1995 | Mayer et al. | 429/152 |
| 5,427,875 | 6/1995 | Yamamoto et al. | 429/218 |
| 5,436,091 | 7/1995 | Shackle et al. | 429/192 |
| 5,478,674 | 12/1995 | Miyasaka | 429/218 |

*Primary Examiner*—Hoa Van Le

[57] ABSTRACT

The composite positive electrode comprises a metallic current collector sheet the surface of which bears a double layer of a mixed oxide interface containing an oxide of the metal of the current collector and a transition metal oxide, and a layer of the same transition metal oxide over the mixed oxide interface. The double layer is in contact with a positive electrode containing an oxide of the same transition metal as the cathode active ingredient. The composite positive electrode is designed to be incorporated in a rechargeable lithium battery.

20 Claims, 3 Drawing Sheets

COMPOSITE ELECTRODE FOR A LITHIUM BATTERY

FILED OF INVENTION

This invention relates to electrodes in contact with current collectors utilized in electrochemical batteries, in particular in lithium batteries.

BACKGROUND TO THE INVENTION

Rechargeable lithium ion batteries have a negative electrode containing elemental lithium, which is often intercalated in some carbonaceous substance, a positive electrode bearing an oxide which is capable of incorporating lithium ions in its structure and an electrolyte containing mobile lithium ions, located between the negative and positive electrodes. The positive electrode may also contain a lithium compound having dissociable lithium ions, a binder mixed with the oxide, and fine carbon added to the mixture. The oxide in the positive electrode is usually a transition metal oxide. The electrolyte is commonly a solid organic polymer or a non-aqueous liquid, which has a lithium salt dissolved in it or contains dissociable lithium ions in some other form. The electrolyte may also be a microporous solid polymer which has been impregnated with an organic liquid containing a dissociable lithium salt. The electrolyte which is non-conductive of electrons, provides ionic passage for lithium ions only. Lithium ions move from the elemental lithium containing negative electrode or anode to the transition metal oxide containing positive electrode or cathode, on discharge of the battery. Lithium ions are moved from the cathode or positive electrode through the electrolyte to the negative electrode in the recharging step. The above lithium ion battery may be button shaped or be constructed of thin laminates forming a conventional thin film or planar battery. The external faces of the electrodes are in contact with current collectors, which are usually in the form of metal foil or metal sheet. Lithium batteries need to be protected from atmospheric corrosion and are usually enclosed in some form of air-tight container or polymer film.

One of the difficulties in manufacturing a lithium ion battery which is capable of prolonged service life, is to promote and maintain satisfactory electrical contact between the current collector and the face of the electrode adjacent to the current collector while also ensuring corrosion protection. There are conventional ways for exerting pressure on the contact surfaces or sealing the individual cells in a tough polymer wrapping under pressure, however, the exerted pressure may weaken in use, in particular in the case of flat batteries made of laminates, and/or the seal may be broken. Contact between the interactive surfaces, in particular between the current collector and the face of the positive electrode in contact with it, may diminish due to delamination caused by lack of adhesion or other factors, such as for example, released gases that had been absorbed by the contact surfaces. At any rate, conventional methods of applying and maintaining pressure on the electrode-current collector contact surfaces may add several costly additional steps to the battery manufacturing process, which may not even be effective in prolonged use.

There are known methods of providing a layer of carbon fibres or fine carbon particles, or an electronically conductive inorganic or organic polymer layer between the metallic current collector and the appropriate surface of the elemental lithium bearing negative electrode for providing the required electric contact. In another approach in providing contact between the electrode and the current collector, Koksbang et al. in U.S. Pat. No. 5,368,959, issued on Nov. 29, 1994, describe an electrically conductive organic polymer layer on the external face of the transition metal compound containing positive electrode of a lithium battery, for taking the role of the current collector. Manufacturing an electronically conductive polymer layer which is also tough, may notably increase production costs, and may not prevent delamination between the contact surfaces of a lithium battery.

In a different field of alkaline batteries utilizing zinc anode and manganese dioxide cathode, T. L. Dunham, in U.S. Pat. No. 5,278,006 issued on Jan. 11, 1994, teaches a nickel plated steel clip acting as current collector which has a layer of platinum, rhodium or palladium coated on the clip facing the manganese dioxide cathode to improve electrical contact. As is well known, plating precious metals on contact surfaces is an expensive process, moreover it would not prevent delamination of the battery, nor would a precious metal coating assist in maintaining contact between the interactive surfaces of a lithium battery pack.

There is a need for an inexpensive method for maintaining good electrical contact in a lithium battery between a conventional metallic foil or sheet metal current collector and a transition metal oxide bearing positive electrode.

SUMMARY OF THE INVENTION

It is the object of the present invention to provide a composite positive electrode for utilization in a rechargeable lithium battery, that has greatly increased adherence between the face of the metallic current collector and the appropriate face of the positive electrode. The composite positive electrode is comprised of:

i) a metallic current collector sheet, which is made of or carries on its major face an oxidizable metal or an alloy containing at least one oxidizable metal, ii) a mixed oxide interface layer bonded to a major face of the metallic current collector sheet, the mixed oxide interface layer comprising an oxide of the oxidizable metal in the metallic current collector sheet and a first oxide of a transition metal, the transition metal being selected from the group consisting of manganese, cobalt, nickel, vanadium, tungsten and alloys thereof, iii) a layer of the first oxide of the transition metal bonded to the mixed oxide interface layer, and iv) a positive electrode layer comprising a second oxide of the transition metal, the second oxide of the transition metal oxide being capable of incorporating lithium ions in its structure.

The mixed oxide interface layer and the layer of the first oxide of the transition metal form a chemical and physical continuum between the metallic current collector sheet and the positive electrode layer. Depending on the nature of the transition metal utilized, the first and second transition metal oxide may have the same composition.

In another embodiment of the invention the mixed oxide interface layer and the transition metal oxide layer are bonded to both major faces of the metallic current collector sheet, and each face of the metallic collector sheet is in contact with a positive electrode layer.

In a third embodiment of the invention the current collector is an elongated metallic sheet, and bonded to one or both both major faces is a continuous mixed oxide interface layer overlain by a transition metal oxide layer. The positive electrode comprising the same or another oxide of the same transition metal, in contact with the transition metal oxide layer, is in the form of discrete electrode plates.

DETAILED DESCRIPTION OF THE PREFERRED EMBODIMENTS

Figure 1:
FIG. 1 is a SEM photograph of a cross-section of an aluminum current collector sheet bearing a mixed oxide interface layer and a transition metal oxide layer bonded to the interface layer.

As discussed above, there are no fully satisfactory known ways of avoiding possible delamination between the positive electrode and the metallic current collector sheet in contact with the positive electrode of a lithium battery. It has now been found that when a mixed oxide layer, composed of an oxide of a metal present in the metallic current collector sheet or foil and an oxide of the transition metal providing the active ingredient of the positive electrode, is obtained on the face of the metallic current collector sheet in contact with the corresponding face of the positive electrode, the obtained mixed oxide layer is strongly adherent and is chemically bonded to the surface of the metallic current collector, such that it may only be removed by force. It has also been found that a separate second layer composed of the oxide of the transition metal present in the positive electrode, can be deposited to overlay the mixed oxide interface layer, thus the second layer forms a continuous layer on the adherent mixed oxide interface of the metallic current collector sheet. It has been surprisingly found that the overlaying transition metal oxide layer grows out of the distal face of the mixed oxide layer, away from the metallic current collector sheet, thus the mixed oxide interface layer and the transition metal oxide layer together provide a physical and chemical continuum, which is adjacent the positive electrode when the appropriate face of the metallic current collector sheet is placed in contact with the positive electrode containing another or the same oxide of the same transition metal. In accordance with the present invention, a composite positive electrode is obtained which is composed of a metallic current collector sheet and a positive electrode bearing a transition metal oxide as active ingredient, having a continuous layer of a mixed oxide interface layer overlain by a layer of an oxide of the transition metal, located between the metallic current collector sheet and the transition metal oxide containing positive electrode. On account of the chemical similarity between the transition metal oxide layer overlaying the mixed oxide interface layer and the oxide of the same transition metal in the positive electrode, substantial adherence is found between the layers bonded to the metallic current collector sheet and the positive electrode.

The metallic current collector sheet in contact with the positive electrode, commonly utilized in lithium batteries is aluminum or an alloy of aluminum. Aluminum or reactive metals like aluminum, are readily oxidized and the oxide usually forms an adherent layer on the surface of the metal.

The metallic current collector sheet may also be a copper foil which carries a continuous aluminum layer deposited by conventional vapour phase transfer or electrolytic deposition, or by any other known means, on one or both of its faces. The deposited layer may also be an alloy of aluminum.

It is noted for the sake of clarity, that a sheet is usually considered to be a foil if its thickness is less than 0.025 mm (25mµ or 1 thou). In the discussion hereinbelow the metallic current collector will be referred to as a sheet, irrespective of its thickness.

The composite positive electrode described herein is of particular use in rechargeable lithium batteries, but it may be utilized in other batteries which require adhesion between the metallic current collector and an oxide containing electrode, such as for instance, a manganese dioxide electrode in an alkaline battery.

The mixed oxide layer is prepared by depositing a transition metal compound on the surface of the metallic current collector sheet and simultaneously applying heat and/or atmospheric oxidation. The resulting mixed oxide layer is continuous, and is bonded chemically so strongly to the metallic current collector sheet that it cannot be detached by simple physical means. Continuing the application of the transition metal compound results in the formation of a layer made of the transition metal oxide only, thereby forming a coating on the mixed oxide interface layer. The transition metal oxide top layer is subsequently brought into contact with the positive electrode. The obtained oxide layers bonded to one another may only be a fraction of a micron (µm) thick or extend to several micron thickness, however, they form a chemical and physical continuum between the metallic current collector sheet facing the positive electrode and the appropriate face of the positive electrode. The preferred thickness of the bonded composite oxide layers is greater than 0.05 µm.

The transition metal commonly utilized in the positive electrode of a lithium battery may be manganese, cobalt, nickel, vanadium, tungsten, and alloys of these metals with one another, or with chromium or silver. The oxide in the positive electrode may be a higher valent oxide and the oxide in the mixed oxide layer may be a lower valent oxide of the same transition metal, or the oxide in the mixed oxide layer and that contained in the positive electrode may have the same composition. Thus the mixed oxide layer may contain manganous oxide and the positive electrode may have manganese dioxide as its active ingredient, in which the manganese is tetravalent. In another combination the manganese may be present in both of these battery components in the divalent form. Similarly, in utilizing another transition metal, e.g. vanadium, the vanadium in the mixed oxide interface layer may be trivalent and in the positive electrode may be present as vanadium dioxide, or the vanadium may be in the tetravalent form in both battery components. It is usual but not necessary, that when nickel or cobalt is utilized as the transition metal, the metals are present in the same valency state in the mixed oxide interface layer as in the positive electrode.

A convenient method of growing the mixed oxide interface layer is placing a coating of an aqueous solution of a compound of the selected transition metal, for example of manganese, on one face of the aluminum sheet that is to be utilized as current collector adjacent to the positive electrode in a lithium battery, and heating the coating in a conventional manner to evaporate the solution. The manganese compound that is utilized, needs to be water-soluble and yield a manganese oxide subsequent to the solution having been evaporated and decomposed. The preferred manganese compounds are manganese salts such as manganese nitrate, manganese chloride, manganese nitrite, manganese acetate, manganese formate, manganous acid and permanganous acid containing compounds, or other chemical equivalents, which are readily available. The convenient concentration of the solution is 1–2 Molar, but the exact concentration is dictated by convenience. The oxide layers may be formed in a single coating application, or several coatings may be applied, each coating being evaporated before the next coating is applied.

Similar considerations apply when making by means of the above method a mixed oxide interface utilizing one of the other transition metals listed above. The transition metal compounds suitable for obtaining a mixed oxide transition metal oxide containing interface layer overgrown by the transition metal oxide layer, are conveniently selected from the following water-soluble salts: nitrates, nitrites, chlorides, salts of simple organic acids, such as acetates, formates, citrates, anionic compounds of the transition metal, and chemical equivalents. The main requirement when selecting a suitable transition metal compound is that the transition metal compound be water-soluble and yield an oxide when the aqueous solution is evaporated and decomposed. FIG. 1 shows the SEM photograph of the cross-section of an aluminum foil having a mixed oxide layer of alumina and manganese oxide bonded to the aluminum and a manganese oxide layer grown on top of the mixed oxide interface layer. The aluminum is shown as the whitish substrate carrying the darker, structurally uneven oxide layer. It is noted that the oxide layers are completely adherent to the aluminum foil and form a continuous layer. It is further noted that the mixed oxide interface layer is usually very thin and may not be visibly observed as a separate layer.

The mixed oxide interface layer and the overlaying transition metal oxide layer may be obtained by other convenient methods, such as for example, electrolytically depositing onto an oxidized metallic current collector sheet a transition metal from an aqueous solution containing a transition metal compound, by the usual means and subsequently anodically oxidizing the deposit bonded to the metallic current collector sheet. Yet another method may be vapour deposition of the transition metal, or its oxide or a compound of it, onto the face of the metallic current collector sheet and subsequently heat treating the deposited layer in the presence of oxygen or air. Any conventional process involving a chemical reaction between the face of an oxidizable metal which is suitable as a current collector or is carried by the current collector, and the desired transition metal, may be adapted to yield the mixed oxide interface layer bonded to the metallic current collector and overlain by the transition metal oxide layer.

The metallic current collector sheet may be provided with a mixed oxide interface layer on both of its faces if so desired. Each of the mixed oxide interface layers is subsequently overlain with the appropriate transition metal oxide layer.

The positive electrode incorporating the transition metal oxide, such as manganese dioxide, cobalt oxide, nickel oxide, vanadium oxide, tungsten oxide or similar oxide, usually also contains a lithium compound, and a binder to allow the formation of a coherent positive electrode pellet or layer. The positive electrode mixture may also include fine carbon particles. Fine carbon is usually understood to mean particle size less than 1 μm. The above mixture either as a pellet or as a laminated layer, is brought in contact with the metallic current collector carrying the mixed oxide interface layer overlain by the transition metal oxide layer, to form the composite positive electrode, which is subsequently juxtaposed a conventional lithium ion conducting electrolyte and a lithium bearing anode, to be utilized in a rechargeable lithium battery.

The composite positive electrode of the present invention may be incorporated in a conventional lithium battery of button shape or having laminated planar configuration. The planar lithium battery may be a single or a multiple cell construction, or may have an electrochemical cell on each side of the central metallic current collector sheet.

The metallic current collector may also be an elongated metallic foil, sheet or a metallic mesh providing a folded composite positive electrode in a battery constructed of stacked lithium cells. The positive electrode comprising an oxide of the transition metal may be a continuous layer or may be in the form of discrete electrode plates. The elongated metallic current collector sheet, such as aluminum or copper coated with aluminum, having a mixed oxide interface layer of alumina and a transition metal oxide bonded to it and overlain by the transition metal oxide, is subsequently folded and a discrete positive electrode plate or plates bearing the same or another oxide of the same transition metal, is placed between the folds in a known manner.

The above conventional rechargeable lithium batteries may have lithium ion conducting solid polymer electrolytes or a microporous polymer impregnated with a lithium compound containing organic liquid, or similar known lithium ion conducting organic electrolytes. The anode or the negative electrode in the rechargeable lithium battery may contain lithium intercalated in some form of carbon or may be comprising elemental lithium or its alloy.

EXAMPLE 1

A 3 inch (75 mm) wide aluminum sheet of 13 mm thickness was coated with a potassium permanganate solution on one of its faces. The solution strength was 2 Molar. The coated face was heated by an infrared heater to evaporate the solution and provide a continuous manganese oxide layer on the aluminum sheet. The aluminum sheet having a coating on one of its faces was subsequently washed in distilled water to remove any trapped and unoxidized manganese salt and then dried.

The SEM photograph of a cross-section of the aluminum carrying a mixed oxide interface layer and having a manganese oxide layer on top of the mixed oxide interface, is shown on FIG. 1. The aluminum substrate appears as a whitish layer and the manganese oxide appears as a dark layer of solidified bubbles, suggesting that the dark layer was formed by evaporation of the solution. The mixed oxide interface may be discernible as a diffuse layer but not as a separate layer.

Figure 2A:
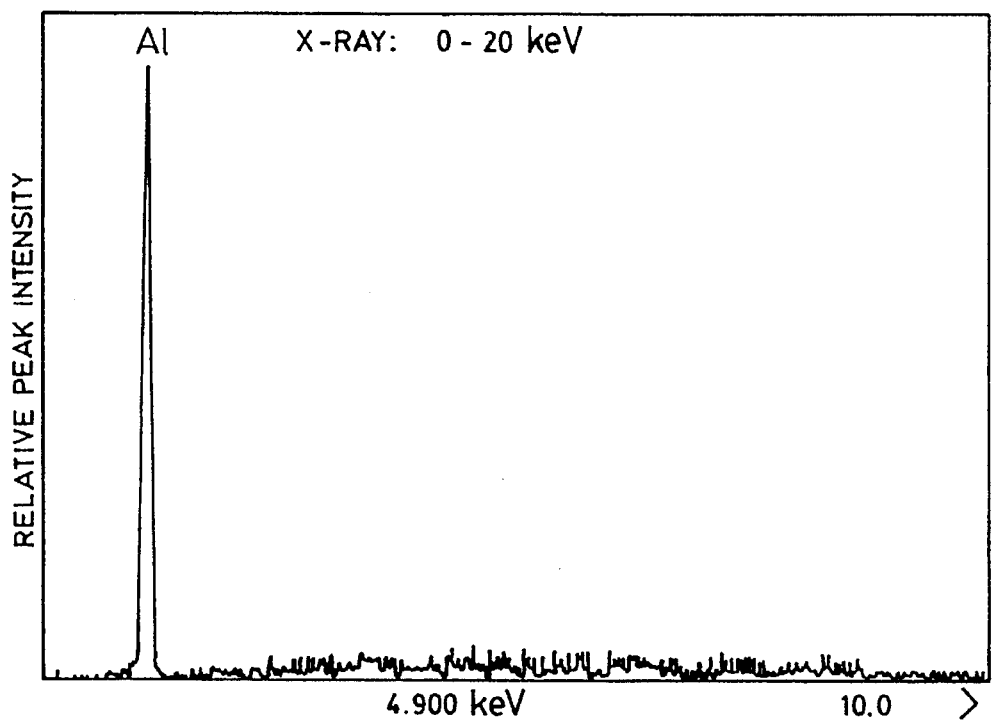
FIG. 2a shows the EDAX analysis of aluminum present in the current collector sheet portion of the cross-section.
Figure 2B:
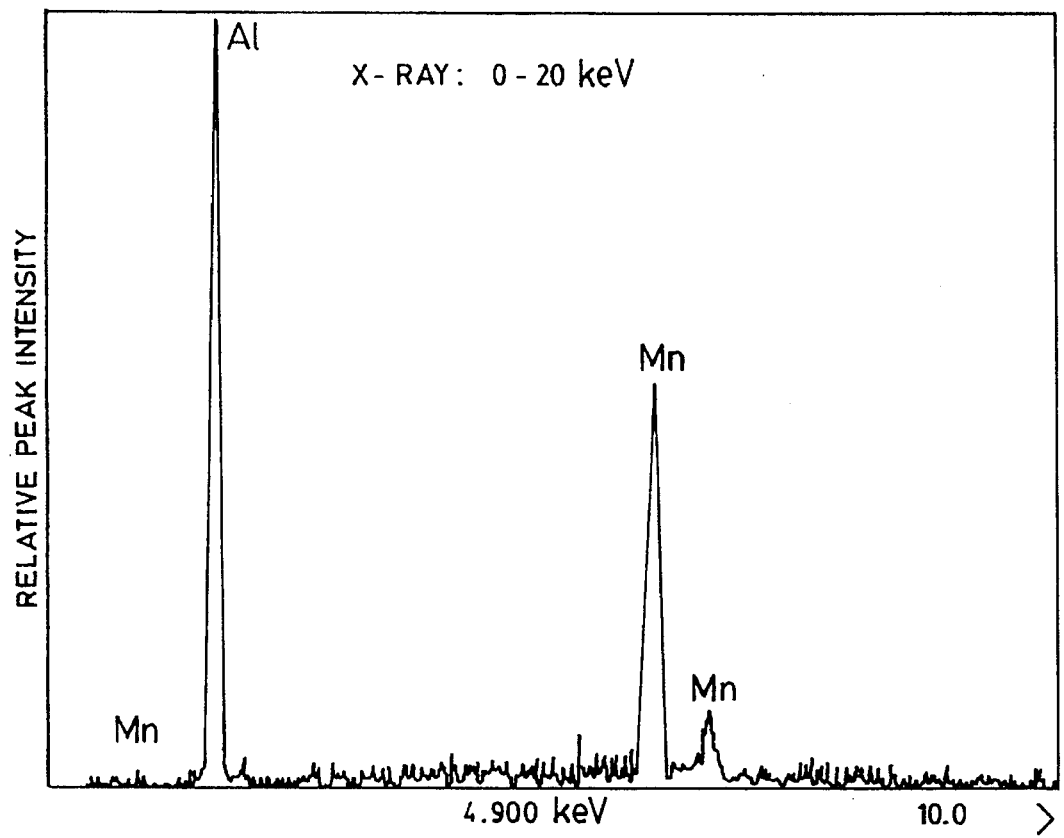
FIG. 2b shows the EDAX analysis of the layers of the mixed oxide interface composed of alumina and manganese as the transition metal oxide.

The composition of the layers is represented by EDAX analysis on FIGS. 2a and 2b. As is known, EDAX analysis can detect only components having atomic number greater than 20, i.e. the oxygen in the oxide is not detected. FIG. 2a is the EDAX analysis of the aluminum foil showing an Al peak and traces of manganese and sodium which is assumed to have been adsorbed from the manganese nitrate solution. FIG. 2b depicts the EDAX analysis of the mixed oxide interface layer overlain by the manganese oxide layer, indicating the presence of aluminum and manganese in approximately equal amounts.

The manganese oxide outer layer carried on one face of the aluminum foil, was coated with a paste containing lithium manganese oxide, carbon particles and PVDF (polyvinylidene fluoride) as binder, for utilization as the cathode component in the composite positive electrode of the battery. The cathode layer thickness in the composite positive electrode was 0.5 mm. A polyethylene oxide laminate containing $LiPF_6$ in 1.2M concentration served as the electrolyte. The composite positive electrode and the electrolyte were folded into two and a copper foil coated with conventional lithium intercalated carbon particles on both faces, was sandwiched between the folded laminates to make up the lithium battery.

EXAMPLE 2

Copper foil of 15 μm thickness and 4" (10 cm) width, was coated with about 1 μm aluminum layer on both of its faces by vapour phase deposition (sputtering) in partial vacuum in the usual manner.

Figure 3:
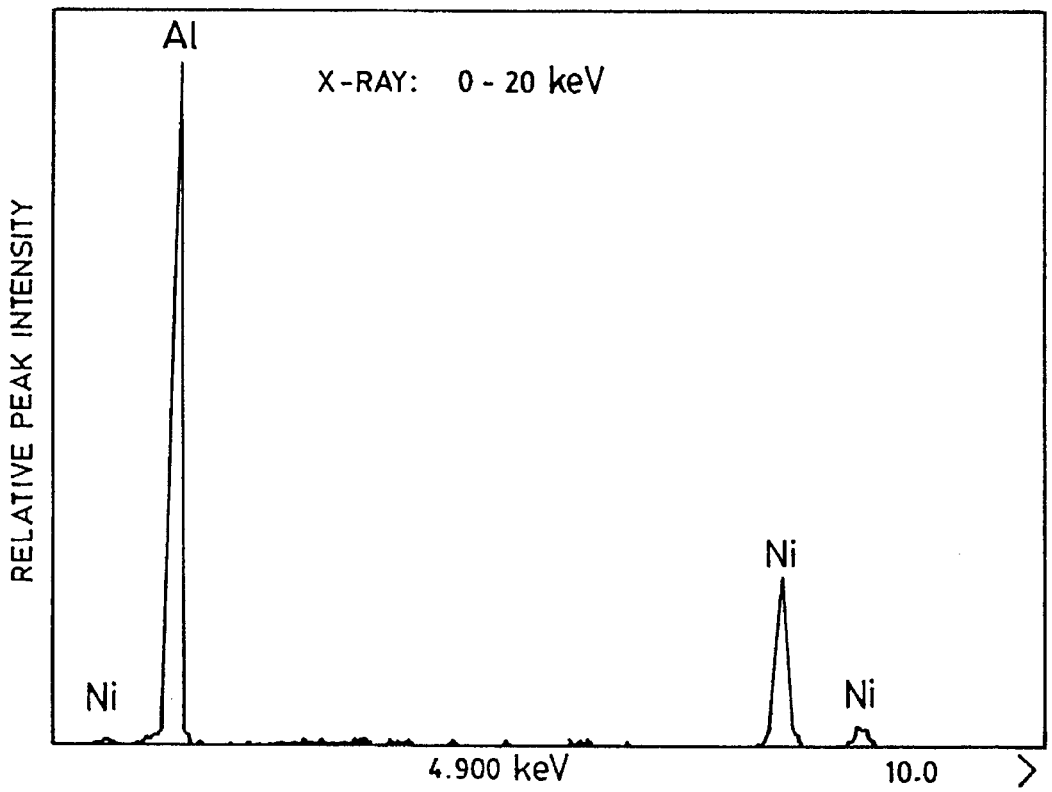
FIG. 3 depicts the EDAX analysis of a mixed oxide interface layer portion made of alumina and nickel oxide bonded to aluminum carried on a copper current collector.

The aluminum coated copper foil was subsequently coated with nickel metal deposited by known vapour phase deposition methods, in partial vacuum, on both faces. The thickness of the obtained nickel layer was about 2–3 μm. The nickel coating was subsequently subjected to hot rolling at about 300° C. in air to oxidize the nickel and to obtain simultaneously an alumina-nickel oxide containing mixed oxide interface underlying the nickel oxide. It is expected that the top surface of the aluminum was instantly oxidized as it was deposited on the copper foil. The rolled surfaces were black indicating the presence of nickel oxide. FIG. 3 represents the EDAX analysis of the obtained mixed oxide interface layer overlain by nickel oxide layer, showing the presence of both aluminum and nickel.

Both nickel oxide layers obtained on the aluminum coated copper foil, were subsequently coated with a paste containing nickel oxide as the cathode active ingredient. The other components of the paste were $LiPF_6$, fine particles of carbon and polyvinylidene fluoride as binder. The double sided composite positive electrode made as described above, was subsequently brought into contact with a microporous polyethylene laminate impregnated with an organic solution containing a lithium salt, and fan-folded in a known manner. Copper current collectors carrying discrete laminates of carbon intercalated with lithium, were sandwiched between the folds. The obtained lithium battery contained nine stacked electrochemical cells, packed and sealed in the usual manner.

EXAMPLE 3

Figure 4:
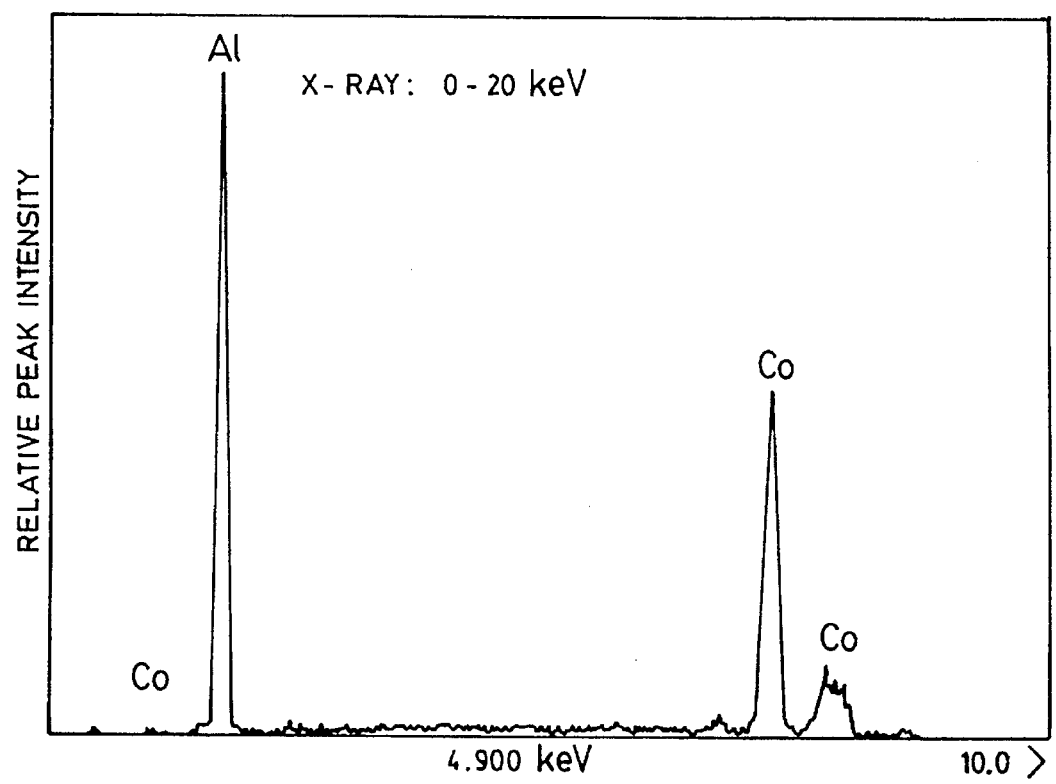
FIG. 4 shows the EDAX analysis of a mixed oxide interface layer portion made of alumina and cobalt oxide bonded to another aluminum current collector sheet.

An aluminum sheet of 0.6 mm thickness was immersed in a solution containing cobalt nitrate in 2 Molar concentration. The aluminum sheet first served as the cathode thereby having a layer of cobalt deposited on one of its faces. The polarity of the sheet was then reversed and the cobalt coating on the aluminum sheet was anodically oxidized. The treated sheet was subsequently annealed at higher than 400° C., thus yielding an adherent layer composed of a mixed oxide interface of alumina and cobalt oxide overlain by cobalt oxide. The composition of the oxide layers indicated by EDAX analysis, is depicted on FIG. 4.

The cobalt oxide bearing aluminum sheet was coated on the cobalt oxide bearing side with a 1 mm thick positive electrode layer containing cobalt oxide as active ingredient, a conventional lithium salt, carbon particles and a binder. 3 cm diameter disks were subsequently stamped out of the aluminum sheet carrying the oxide layers on one face, covered by the cobalt oxide bearing positive electrode, and the composite positive electrode disks obtained were incorporated in button-shaped rechargeable lithium batteries in the usual manner.

As was described in the above examples, thin, stable, mixed oxide interface and transition metal oxide layers, adhering strongly to the metallic current collector, can be obtained, which form a conductive bridging device between the metallic current collector and the transition metal oxide containing positive electrode.

The foregoing has described the principles, preferred embodiments and modes of operation of the present invention. However, the invention should not be construed as limited to the particular embodiments discussed. Instead, the above-described embodiments should be regarded as illustrative rather than restrictive, and it should be appreciated that variations may be made in those embodiments by workers skilled in the art without departing from the scope of the present invention as defined by the following claims.

We claim:

1. A composite positive electrode for utilization in a rechargeable lithium battery, having a metallic current collector and a transition metal oxide containing positive electrode in contact with the metallic current collector, comprising:

i) a metallic current collector sheet, bearing at least one oxidizable metal, ii) a mixed oxide interface layer bonded to a major face of said metallic current collector sheet, said mixed oxide interface layer comprising an oxide of said oxidizable metal in said metallic current collector sheet and a first oxide of a transition metal, said transition metal being selected from the group consisting of manganese, cobalt, nickel, vanadium, tungsten and alloys thereof, iii) a layer of said first oxide of said transition metal overlain and bonded to said mixed oxide interface layer, and iv) a positive electrode layer comprising a second oxide of said transition metal, said second oxide of said transition metal oxide being capable of incorporating lithium ions in its structure; wherein said mixed oxide interface layer and said layer of said first oxide of said transition metal form a chemical and physical continuum between said metallic current collector sheet and said positive electrode layer.

2. A composite positive electrode for utilization in a rechargeable lithium battery, having a metallic current collector and a transition metal oxide containing positive electrode in contact with the metallic current collector as claimed in claim 1, wherein said mixed oxide interface layer and said layer of said first oxide of said transition metal overlain and bonded to said mixed oxide interface layer have a combined thickness in excess of 0.05 μm.

3. A composite positive electrode for utilization in a rechargeable lithium battery, having a metallic current collector and a transition metal oxide containing positive electrode in contact with the metallic current collector as claimed in claim 1, wherein said mixed oxide interface layer and said layer of said first oxide of said transition metal are obtained by chemical reaction between said major face of said metallic current collector sheet and a compound of said transition metal.

4. A composite positive electrode for utilization in a rechargeable lithium battery, having a metallic current collector and a transition metal oxide containing positive electrode in contact with the metallic current collector as claimed in claim 1, wherein said mixed oxide interface layer and said layer of said first oxide of said transition metal are obtained by electrolytic treatment of said metallic current collector sheet in a solution containing a compound of said transition metal.

5. A composite positive electrode for utilization in a rechargeable lithium battery, having a metallic current collector and a transition metal oxide containing positive electrode in contact with the metallic current collector as claimed in claim 1, wherein said mixed oxide interface layer and said layer of said first oxide of said transition metal are obtained by vapour phase deposition of said transition metal onto said major face of said metallic current collector sheet and subsequent oxidation.

6. A composite positive electrode for utilization in a rechargeable lithium battery, having a metallic current collector and a transition metal oxide containing positive electrode in contact with the metallic current collector as claimed in claim 1, wherein said positive electrode layer comprising a second oxide of said transition metal, has thickness in excess of 0.02 mm.

7. A composite positive electrode for utilization in a rechargeable lithium battery, having a metallic current collector and a transition metal oxide containing positive electrode in contact with the metallic current collector as claimed in claim 1, wherein said metallic current collector sheet is made of aluminum or an alloy thereof.

8. A composite positive electrode for utilization in a rechargeable lithium battery, having a metallic current collector and a transition metal oxide containing positive electrode in contact with the metallic current collector as claimed in claim 1, wherein said metallic current collector sheet is made of copper, one face of which bears a continuous coating of aluminum or an alloy thereof.

9. A composite positive electrode for utilization in a rechargeable lithium battery, having a metallic current collector and a transition metal oxide containing positive electrode in contact with the metallic current collector as claimed in claim 1, wherein said transition metal in said first oxide has the same oxidation state as in said second oxide of said transition metal.

10. A composite positive electrode for utilization in a rechargeable lithium battery, having a metallic current collector and a transition metal oxide containing positive electrode in contact with the metallic current collector as claimed in claim 1, wherein said oxide of said oxidizable metal is alumina and said transition metal is manganese.

11. A composite positive electrode for utilization in a rechargeable lithium battery, having a metallic current collector and a transition metal oxide containing positive electrode in contact with the metallic current collector as claimed in claim 1, wherein said oxide of said oxidizable metal is alumina and said transition metal is nickel.

12. A composite positive electrode for utilization in a rechargeable lithium battery, having a metallic current collector and a transition metal oxide containing positive electrode in contact with the metallic current collector as claimed in claim 1, wherein said oxide of said oxidizable metal is alumina and said transition metal is cobalt.

13. A composite positive electrode for utilization in a rechargeable lithium battery, having a metallic current collector and a transition metal oxide containing positive electrode in contact with the metallic current collector as claimed in claim 1, wherein said mixed oxide interface layer is bonded to both major faces of said metallic current collector sheet and each mixed oxide interface layer is overlain and has bonded to it a layer of a first oxide of said transition metal.

14. A composite positive electrode for utilization in a rechargeable lithium battery, having a metallic current collector and a transition metal oxide containing positive electrode in contact with the metallic current collector as claimed in claim 1, wherein said positive electrode layer further comprises a lithium salt capable of dissociating and a binder compound.

15. A composite positive electrode for utilization in a rechargeable lithium battery, having a metallic current collector and a transition metal oxide containing positive electrode in contact with the metallic current collector as claimed in claim 1, wherein said metallic current collector is an elongated sheet, said positive electrode layer is made up of discrete electrode plates comprising said second oxide of said transition metal and said mixed oxide interface layer and said layer of said first oxide of said transition metal form a chemical and physical continuum between said metallic current collector sheet and said positive electrode plate.

16. A rechargeable lithium battery having:
   a) a negative electrode,
   b) a lithium ion conducting electrolyte, and
   c) a composite positive electrode having a metallic current collector and a transition metal oxide containing positive electrode in contact with the metallic current collector, comprising:
      i) a metallic current collector sheet, bearing at least one oxidizable metal,
      ii) a mixed oxide interface layer bonded to a major face of said metallic current collector sheet, said mixed oxide interface layer comprising an oxide of said oxidizable metal in said metallic current collector sheet and a first oxide of a transition metal, said transition metal being selected from the group consisting of manganese, cobalt, nickel, vanadium, tungsten and alloys thereof,
      iii) a layer of said first oxide of said transition metal overlain and bonded to said mixed oxide interface layer, and
      iv) a positive electrode layer comprising a second oxide of said transition metal, said second oxide of said transition metal oxide being capable of incorporating lithium ions in its structure;

wherein said mixed oxide interface layer and said layer of said first oxide of said transition metal form a chemical and physical continuum between said metallic current collector sheet and said positive electrode layer.

17. A rechargeable lithium battery as claimed in claim 16, wherein said lithium ion conducting electrolyte is a lithium ion containing solid polymer electrolyte.

18. A rechargeable lithium battery as claimed in claim 16, wherein said lithium ion conducting electrolyte is a microporous polymer impregnated with a lithium ion containing organic liquid.

19. A rechargeable lithium battery as claimed in claim 16, wherein said transition metal in said first oxide has the same oxidation state as in said second oxide of said transition metal.

20. A rechargeable lithium battery as claimed in claim 16, wherein said mixed oxide interface layer is bonded to both major faces of said metallic current collector sheet bearing at least one oxidizable metal.

* * * * *